United States Patent
Tao et al.

(10) Patent No.: US 12,480,116 B2
(45) Date of Patent: Nov. 25, 2025

(54) USE OF LNCRNA XR_595534.2 IN PREPARATION OF MEDICINE FOR TREATMENT OR PREVENTION OF CHRONIC PAIN

(71) Applicant: SOOCHOW UNIVERSITY, Suzhou (CN)

(72) Inventors: Jin Tao, Suzhou (CN); Renfei Qi, Suzhou (CN); Yuan Zhang, Suzhou (CN); Yufang Sun, Suzhou (CN); Shun Tang, Suzhou (CN); Xinghong Jiang, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 866 days.

(21) Appl. No.: 17/775,935

(22) PCT Filed: Feb. 20, 2021

(86) PCT No.: PCT/CN2021/077074
§ 371 (c)(1),
(2) Date: May 11, 2022

(87) PCT Pub. No.: WO2022/156026
PCT Pub. Date: Jul. 28, 2022

(65) Prior Publication Data
US 2023/0159918 A1    May 25, 2023

(30) Foreign Application Priority Data
Jan. 19, 2021   (CN) .................. 202110071236.4

(51) Int. Cl.
*C12N 15/113*    (2010.01)
*A61P 25/04*     (2006.01)
*C12N 15/11*     (2006.01)

(52) U.S. Cl.
CPC .............. *C12N 15/11* (2013.01); *A61P 25/04* (2018.01); *C12N 2310/14* (2013.01)

(58) Field of Classification Search
CPC ................ C12N 15/11; C12N 2310/14; C12N 2310/113; C12N 2330/10; C12N 15/113; A61K 31/713; A61K 45/00; A61P 25/02; A61P 25/06; A61P 25/04
See application file for complete search history.

(56) References Cited

U.S. PATENT DOCUMENTS

2016/0076098 A1    3/2016    Ajit et al.
2019/0106732 A1    4/2019    Spurlock, III

FOREIGN PATENT DOCUMENTS

| CN | 105126119 A | 12/2015 |
| CN | 106619693 A | 5/2017 |
| CN | 111394356 A | 7/2020 |
| WO | 2019067210 A1 | 4/2019 |

*Primary Examiner* — J. E. Angell
*Assistant Examiner* — Julio Washington Gomez Rodriguez
(74) *Attorney, Agent, or Firm* — SZDC Law PC

(57) ABSTRACT

The present invention provides use of lncRNA XR_595534.2 in the preparation of a medicine for the treatment or prevention of chronic pain. In the present invention, trigeminal neuralgia induced by chronic constriction injury of infraorbital nerve in rats is used as a pain model. A specifically and differentially highly expressed long-chain non-coding RNA gene lncRNA XR_595534.2 is screened in the model. An interfering RNA targeting lncRNA XR_595534.2 is provided for disease treatment. The present invention discovers for the first time that lncRNA XR_595534.2, which is specifically and differentially highly expressed in a pain model, has significantly reduced expression by stereotactic injection of an interfering RNA to relieve the pain behavior, and is useful in the preparation of a medicine for the treatment or prevention of trigeminal neuralgia, neuropathic pain, migraine and cancer pain where lncRNA-XR595534.2 is a target.

7 Claims, 3 Drawing Sheets
Specification includes a Sequence Listing.

SEQUENCE LISTING

```
<160> NUMBER OF SEQ ID NOS: 9

<210> SEQ ID NO 1
<211> LENGTH: 19
<212> TYPE: RNA
<213> ORGANISM: Artificial Sequence
<220> FEATURE:
<223> OTHER INFORMATION: Sense strand of interfering RNA

<400> SEQUENCE: 1
ccgugaacug aagcuucau                                                  19

<210> SEQ ID NO 2
<211> LENGTH: 19
<212> TYPE: RNA
<213> ORGANISM: Artificial Sequence
<220> FEATURE:
<223> OTHER INFORMATION: Antisense strand of interfering RNA

<400> SEQUENCE: 2
augaagcuuc aguucacgg                                                  19

<210> SEQ ID NO 3
<211> LENGTH: 21
<212> TYPE: DNA
<213> ORGANISM: Artificial Sequence
<220> FEATURE:
<223> OTHER INFORMATION: Sense strand of interfering RNA including
      dangling base TT
```

```
<400> SEQUENCE: 3
ccgugaacug aagcuucaut t                                              21

<210> SEQ ID NO 4
<211> LENGTH: 21
<212> TYPE: DNA
<213> ORGANISM: Artificial Sequence
<220> FEATURE:
<223> OTHER INFORMATION: Antisense strand of interfering RNA including
      dangling base TT

<400> SEQUENCE: 4
augaagcuuc aguucacggt t                                              21

<210> SEQ ID NO 5
<211> LENGTH: 25
<212> TYPE: DNA
<213> ORGANISM: Artificial Sequence
<220> FEATURE:
<223> OTHER INFORMATION: Forwad primer sequence

<400> SEQUENCE: 5
ggcttgtcag tatgagcagt tagaa                                          25

<210> SEQ ID NO 6
<211> LENGTH: 22
<212> TYPE: DNA
<213> ORGANISM: Artificial Sequence
<220> FEATURE:
<223> OTHER INFORMATION: Reverse primer sequence

<400> SEQUENCE: 6
aattgtcctg tgttcctggt tc                                             22

<210> SEQ ID NO 7
<211> LENGTH: 21
<212> TYPE: DNA
<213> ORGANISM: Artificial Sequence
<220> FEATURE:
<223> OTHER INFORMATION: Forwad primer sequence

<400> SEQUENCE: 7
gtgctgagta tgtcgtggag t                                              21

<210> SEQ ID NO 8
<211> LENGTH: 22
<212> TYPE: DNA
<213> ORGANISM: Artificial Sequence
<220> FEATURE:
<223> OTHER INFORMATION: Reverse primer sequence

<400> SEQUENCE: 8
cagtcttctg agtggcagtg at                                             22

<210> SEQ ID NO 9
<211> LENGTH: 898
<212> TYPE: DNA
<213> ORGANISM: Unkown
<220> FEATURE:
<223> OTHER INFORMATION: lncRNA XR_595534.2

<400> SEQUENCE: 9
agaatcacga aagctttgtg acctaacaat acgacctggg gggaaggcag               50
ggctcctgac ttgggagaca aactgggtta cagatacttg gcagagtttt              100
```

```
gactactttc gacttgggac aaaggcagaa gaaacagcaa gaaagaattg      150
aagagtggtt tattatgtct gtgtcacaaa agggcaggaa accacaactc      200
tgaagacttg gaggacttgg ctaagggaga aaaatcaact gtcaaccggc      250
ttgtcagtat gagcagttag aagtgacatg attggaagca ttaagaacca      300
ggaacacagg acaattttct gagggacgtg catcgaatac attacctaga      350
acacaaactg aatcggatgc tgtagcccac caccgtgaac tgaagcttca      400
tgaagagaga ctcatgtgac cctcgtgtgg aagcgaatgg aacaaagacc      450
aactttccca tttggacccc tggtttctct cgaatgcagt tgtcccatcc      500
tcagcctttg aatgaaatga ctgtgctggt ggtcccacgc ccaggggaaa      550
catcctgtcc cctagaggac cctcagtctg ttggaaagtg taatgagtaa      600
gactcagtga gcagcagagg ctgagaaagt tgggggccaa ggagcaggtc      650
agagtttccc cacttctgct tttaactctc ctccactcaa aatagaaact      700
atttccacct tactccctgt ccccaacctc agcttcaagg tggtctacca      750
caaacactct gagtgacagt aggggagtca ccaactctcc tgtgagtctg      800
cacaccaagc tgaggaaacg gaagcctaga aaggccaaag aaagtactgt      850
gttgaccttt tacaattatt aattaattaa atacatatgg gtgtttta      898
```

USE OF LNCRNA XR_595534.2 IN PREPARATION OF MEDICINE FOR TREATMENT OR PREVENTION OF CHRONIC PAIN

This application is the National Stage Application of PCT/CN2021/077074, filed on Feb. 20, 2021, which claims priority to Chinese Patent Application No. 202110071236.4, filed on Jan. 19, 2021, which is incorporated by reference for all purposes as if fully set forth herein.

FIELD OF THE INVENTION

The present invention relates to the field of biotechnology and medicine, and more particularly to use of lncRNA XR_595534.2 in the preparation of a medicine for the treatment or prevention of chronic pain.

DESCRIPTION OF THE RELATED ART

Chronic pain (such as trigeminal neuralgia, migraine, neuropathic pain, and cancer pain), also known as "immortal cancer", is a chronic disease that seriously endangers the physical and mental health and life quality of human beings. The characteristics of repeated attacks of pains, persistence and refractoriness cause patients to suffer long-term torture, can induce mood disorders or mental disorders such as anxiety, depression and fear, and even cause individuals to have suicidal tendencies, which seriously endanger the survival and life quality of patients. Preparations that relieve pain can be divided into two categories according to the pharmacological mechanism: non-steroidal anti-inflammatory analgesics and opioid receptor agonists. The former is only effective for mild to moderate pain, and tends to cause severe side effects such as gastric bleeding after administration. The latter has a potent analgesic effect, but has a poor effect on chronic neuropathic pain and is accompanied by respiratory depression and constipation, especially development of resistance to the analgesic effect and dependence and addiction after long-term use. Therefore, there is a particularly urgent need to seek a novel safe and effective analgesic medicine that can avoid serious side effects.

Epigenetics is a branch of biology that studies the genetic changes in gene expression while the DNA sequence has no change. It is an important mechanism for the formation of chronic pain caused by adverse factors such as tissue inflammation, injury, and disease conditions. Long chain non-coding RNAs (lncRNAs) play an important role in epigenetic regulation. They are a class of RNA molecules with a transcript length of more than 200 nucleotides, used to regulate gene expression, cell differentiation and function in multiple aspects such as epigenetic regulation, transcription level and post-transcriptional regulation, and thus widely involved in the physiological and pathological processes of the body, such as in regulation of embryonic development, inflammation and pain diseases. Therefore, the study of neurobiological mechanism underlying peripheral sensitization of pain (such as trigeminal neuralgia, neuropathic pain and migraine) and its epigenetic regulation (such as lncRNA) will not only promote the discovery of a beneficial target of a clinical medicine for the treatment of pain, and is of great significance for improving the quality of life and health of human.

SUMMARY OF THE INVENTION

In order to solve the above technical problems, in the present invention, trigeminal neuralgia induced by chronic constriction injury (CCI-ION) of infraorbital nerve in rats is used as a pain model. A specifically and differentially highly expressed long-chain non-coding RNA gene lncRNA XR_595534.2 is screened in the pain model. A small interfering RNA (siRNA) targeting lncRNA XR_595534.2 is provided for disease treatment.

A first object of the present invention is to provide use of lncRNA XR_595534.2 in the preparation of a medicine for the treatment or prevention of chronic pain.

Preferably, the chronic pain comprises trigeminal neuralgia, migraine, neuropathic pain and cancer pain.

Preferably, the use includes preparing a medicine that interferes with the expression of lncRNA XR_595534.2, with lncRNA XR_595534.2 as a therapeutic target.

A second object of the present invention is to provide an interfering RNA, where the interfering RNA can target and interfere with the expression of lncRNA XR_595534.2.

Preferably, the interfering RNA comprises the nucleotide sequence CCGUGAACUGAAGCUUCAU (SEQ ID NO:1).

Preferably, the sense strand of the interfering RNA comprises the nucleotide sequence: 5'-CCGUGAACUGAAGCUUCAU-3' (SEQ ID NO:1); and the antisense strand of the interfering RNA comprises the nucleotide sequence: 5'-AUGAAGCUUCAGUUCACGG-3' (SEQ ID NO:2).

Preferably, the interfering RNA includes a dangling base TT; and the dangling base is located at the 3'-terminus of the sense strand and the antisense strand of the interfering RNA.

Preferably, in the interfering RNA including the dangling base TT, the sequence of the sense strand is: 5'-CCGUGAACUGAAGCUUCAUTT-3' (SEQ ID NO:3); and the sequence of the antisense strand is: 5'-AUGAAGCUUCAGUUCACGGTT-3' (SEQ ID NO: 4).

Preferably, the interfering RNA can be modified by cholesterol, phosphorylation, sulfhydrylization and any combination thereof.

A third object of the present invention is to provide a medicine for the treatment of chronic pain, where the medicine includes 0.1-100 wt % of the interfering RNA and 0-99.9 wt % of a pharmaceutical adjuvant.

By means of the above technical solutions, the present invention has the following advantages.

The present invention discovers for the first time that lncRNA gene, lncRNA XR_595534.2 (SEQ ID NO: 9), which is specifically and differentially highly expressed in a pain model. lncRNA XR_595534.2 has significantly reduced expression by stereotactic injection of the interfering RNA (comprising a sequence of CCGUGAACUGAAGCUUCAU, SEQ ID NO: 1), to alleviate the pain behavior, and can be used to prepare a medicine for the treatment or prevention of trigeminal neuralgia, neuropathic pain, migraine and cancer pain where lncRNA-XR595534.2 is a target.

The above description is merely an overview of the technical solution of the present invention. To make the technical means of the present invention more clearly and implement the present invention according to the description, preferred embodiments of the present invention are described below in connection with detailed drawings.

DETAILED DESCRIPTION OF THE PREFERRED EMBODIMENTS

Figure 1:
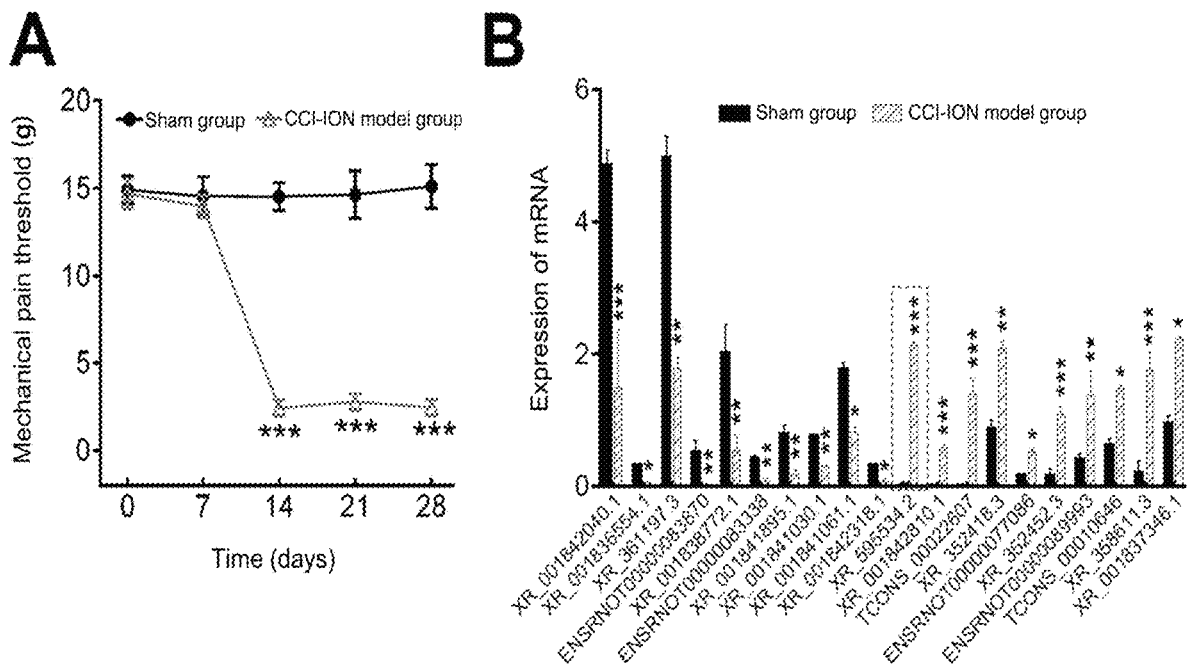
FIG. 1A shows the mechanical pain threshold in a rat model of chronic constriction injury of infraorbital nerve (CCI-ION).
FIG. 1B shows high-throughput sequencing results demonstrating the differentially highly expressed lncRNAs in the TG tissue of a CCI-ION model rat.

The specific implementation of the present invention will be described in further detail below in conjunction with the examples. The following examples are used to illustrate the present invention, but not to limit the protection scope of the present invention.

Example 1: High-Throughput Sequencing Results Show that lncRNA is Differentially and Highly Expressed in the TG Tissue of a CCI-ION Model Rat (1) Chronic constriction injury model of infraorbital nerve (CCI-ION) Healthy adult male Sprague-Dawley rats, weighing 180-250 grams, were provided by the Laboratory Animal Center of Suzhou University. The approved sanitary-level document number from the Animal Center is SYXK (Su) 2007-0035. The animals were allowed to adapt to the breeding environment for three days and undergo adaptive stimulation training before the experiment. The model was established by routine laboratory methods: the rats were anesthetized by intraperitoneal injection with 4% chloral hydrate in a dose of 1 ml/100 g, and the rats were immobilized on the operating bench in a supine position, and cut horizontally with a sterile blade at the left maxillary first molar level upper jaw. A blunt curved glass rod was used to carefully separate the surrounding tissues until the infraorbital nerve was exposed. 5-0 suture was used for ligation at both ends, with a distance of 2 mm and a moderate strength. After the operation, the blood stains were wiped with a cotton ball, and penicillin sodium was applied to prevent infection. In the sham group, the infraorbital nerve was only bluntly separated without ligation according to the above method.

(2) Determination of the mechanical pain threshold at the rat's whisker pad

The rat's whisker pad was stimulated with von Frey filament (Stoelting company, model NC12775) until the rat showed an escape behavior as a positive reaction. Starting from 1 gram, the rat's whisker pad was stimulated continuously for 5 times. If there were three positive reactions, a lower level mechanical stimulation was given; if no positive reactions shown, a higher level mechanical stimulation was given. 15 grams was set as the maximum mechanical stimulus intensity and the stimulation proceeded under double-blind conditions. The minimum intensity of a positive reaction in experimental animals was regarded as the mechanical pain threshold of rats. The calculation formula of the final pain threshold is: 50% threshold (g)=$(10^{[Xf+K\delta]})/10000$.

(3) High-throughput sequencing

After anesthesia, the rat was decapitated and placed on ice to expose its TG. A sterile scalpel and micro dissecting forceps were used to pick the TG from the surgical side, from which fibronectin was carefully removed. The TG from the surgical side was immediately placed in a 1.5 ml sterile centrifuge tube and shipped to the company while cooled by dry ice. After RNA extraction, sample detection, library construction, library inspection and computer sequencing, bioinformatics analysis was performed to screen the differentially expressed lncRNAs in the TG tissue of the CCI-ION model rat. The sequencing process was completed by Shanghai Ouyi Company.

Figure 3:
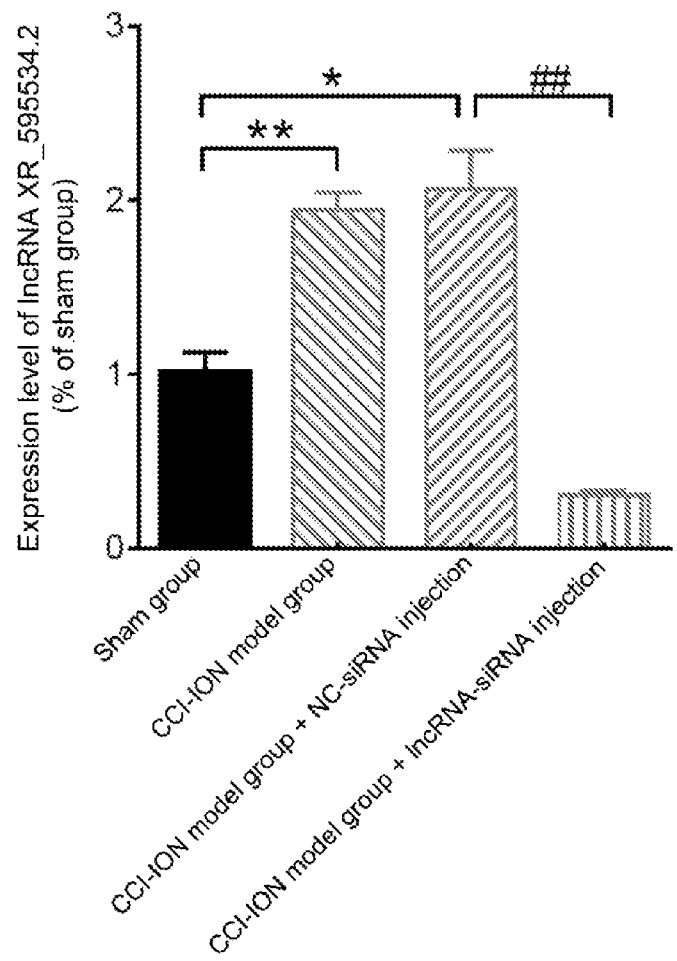
FIG. 3 shows that stereotactic injection of a siRNA interfering sequence in TG can effectively reduce the expression level of lncRNA XR_595534.2 in the TG tissue of a CCI-ION model rat.

As shown in FIG. 1A, 16 SD rats were divided into 2 groups with 8 rats in each group. The first group was the sham group, and the second group was the CCI-ION model group. Compared with the sham group, the mechanical pain threshold at the whisker pad of rats in the CCI-ION model group is significantly reduced from day 14 and through day 28 (***p<0.001 vs. the sham group, N=8). As shown in FIG. 1B, 3 rats in the sham group and 3 rats in the CCI-ION model group were selected on day 14, and TG was used for high-throughput sequencing to screen the differentially expressed lncRNAs in the TG tissue of the rats in the CCI-ION model group. The high-throughput sequencing results show that compared with the rats in the sham group, lncRNA XR_595534.2 out of the first 20 lncRNAs differentially expressed in the TG tissue of the CCI-ION model rats is increased most significantly (*p<0.05, p<0.01, *p<0.001 vs. sham group, n=3).

Example 2: The Expression of lncRNA XR_595534.2 in the TG Tissue of a CCI-ION Model Rat was Significantly Increased as Determined by Fluorescence Quantitative PCR (1) Establishment of chronic constriction injury model of infraorbital nerve (CCI-ION) (see Example 1)

(2) Real-time fluorescence quantitative PCR

RNA extraction: TG of the rat was extracted by a sterile tool and then placed in a 1.5 ml sterile centrifuge tube. 1 ml of Trizol was added. The tissue was homogenized, and placed on ice for 30 min. 100 μl of chloroform was added and centrifuged for 20 min at 4° C. and 12,000 rpm. The upper aqueous phase was pipetted into a new centrifuge tube. An equal volume of isopropanol was added and placed in a refrigerator at −20° C. for 20 min, and then centrifuged for 15 min at 4° C. and 12,000 rpm. The supernatant was discarded. 75% ethanol was added to wash the pellet, and the resultant material was centrifuged for 5 min at 7500 rpm and 4° C. The supernatant was discarded, and 20 μl of DEPC-treated water was added to dissolve the pellet. Finally, NanoDrop 2000 was used to measure RNA concentration.

Fluorescence quantitative PCR: The extracted RNA was reverse transcribed into cDNA using 5× PrimeScript RT Master Mix. The parameters are: reverse transcription at 42° C. for 15 min; and denaturation at 85° C. for 2 min. Subsequently, fluorescence quantitative PCR was performed, and the cycle parameters were: 40 cycles of predenaturation at 95° C. for 15 min; denaturation at 94° C. for 15 seconds; annealing at 60° C. for 30 seconds, and extension at 72° C. for 30 seconds. The experimental results are calculated by 2-AACT For lncRNA XR_595534.2, forward primer sequence: GGCTTGTCAGTATGAGCAGTTAGAA (SEQ ID NO: 5); and reverse primer sequence: AATTGTCCTGTGTTCCTGGTTC (SEQ ID NO: 6). For GAPDH, forward primer sequence: GTGCTGAGTATGTCGTGGAGT (SEQ ID NO: 7); and reverse primer sequence: GCAGTGATTGAG (SEQ ID NO: 8). The primers were synthesized by Ruibo Biotech. Trizol was purchased from Takara, the reverse transcription kit was purchased from Takara, and the SYBR fluorescent dye was purchased from Bimake.

Figure 2:
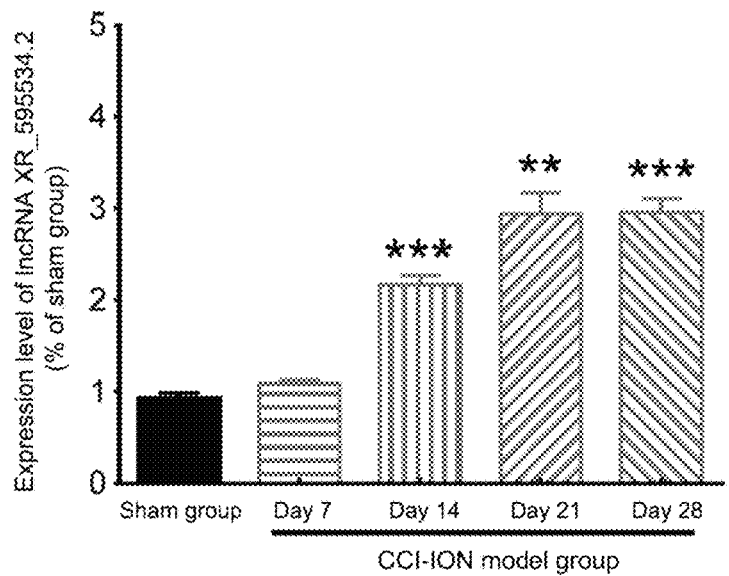
FIG. 2 shows that the expression of lncRNA XR_595534.2 in TG tissue of a CCI-ION model rat is significantly increased, as determined by fluorescence quantitative PCR.

As shown in FIG. 2, 3 rats in the sham group and 3 rats in the CCI-ION model group were selected. RNA was extracted from the TG tissue of the rat from sham group and CCI-ION model group at day 7, CCI-ION model group at day 14, CCI-ION model group at day 21 and CCI-ION model group at day 28. The detection results by fluorescence quantitative PCR show that compared with the sham group, the expression of lncRNA XR_595534.2 in the TG of rats in the CCI-ION model group is increased significantly after day 14, and through day 28 ($p<0.01$, *$p<0.001$ vs. sham group, n=3).

Example 3: SiRNA Interfering Sequence can Effectively Reduce the Expression of lncRNA XR_595534.2 in the TG of CCI-ION Model Rat (1) RNA extraction (see Example 2);
(2) Real-time fluorescence quantitative PCR (see Example 2);
(3) Stereotactic injection of siRNA interfering sequence in TG of rats: After anesthesia, the rat was fixed on a brain stereotaxic device. The scalp was cut with a scalpel. $H_2O_2$ was added to corrode the tissue, and the coronal and sagittal sutures were exposed. The point of intersection of the coronal and sagittal sutures, namely the bregma, was used as the origin for positioning: 3 mm backward from the bregma point, 3 mm left to the midline, and 11.7 mm below the skull surface. The lncRNA XR_595534.2 siRNA (lncRNA-siRNA) and control siRNA (NC-siRNA) (purchased from Gemma Gene) were injected with a final concentration of 50 µm/l. 3 µl was injected for each rat, and the injection was finished in 5 min. The needle was left for 10 min.

As shown in FIG. 3, 24 rats were divided into 4 groups with 6 rats in each group. The first group of rats was the sham group. The second group of rats was the CCI-ION model group, in which saline was stereotactially injected. The third group of rats was the CCI-ION model group, in which NC-siRNA (negative control siRNA) was stereotactially injected in the TG. The fourth group of rats was the CCI-ION model group, in which the siRNA interfering sequence (CCGUGAACUGAAGCUUCAU, SEQ ID NO: 1) of lncRNA XR_595534.2 siRNA (lncRNA-siRNA, Pubmed Blast results show that the siRNA sequence is specific, the lncRNA-siRNA is chemically synthesized by Ruibo biological company and modified by cholesterol to increase the membrane permeability) was stereotactially injected in the TG. After two consecutive days of injection, the TG tissues were extracted from rats of the sham group and CCI-ION model group on day 14 and CCI-ION model group+NC-siRNA injection and CCI-ION model group+siRNA injection after 3 days were subjected to fluorescence quantitative PCR. Compared with the control group, 3 days after injection with siRNA, the expression of lncRNA XR_595534.2 in the TG of rats was significantly reduced (*$p<0.05$, **$p<0.01$ vs. sham group, ##$p<0.01$ vs. CCI-ION model group+NC-siRNA injection). The above results show that the siRNA interfering sequence (CCGUGAACUGAAGCUUCAU, SEQ ID NO:1) can effectively reduce the expression of lncRNA XR_595534.2 in the TG tissue of a CCI-ION model rat.

Example 4: Animal Behavior Test Shows that Stereotactic Injection of the siRNA Interfering Sequence in TG Significantly Reverses the Mechanical Hyperalgesia in a CCI-ION Model Rat (1) Establishment of chronic constriction injury model of infraorbital nerve (CCI-ION) (see Example 1).
(2) Determination of the mechanical pain threshold in the rat's whisker pad (see Example 1).
(3) Stereotactic injection of siRNA interfering sequence in TG in a rat (see Example 3).

Figure 4:
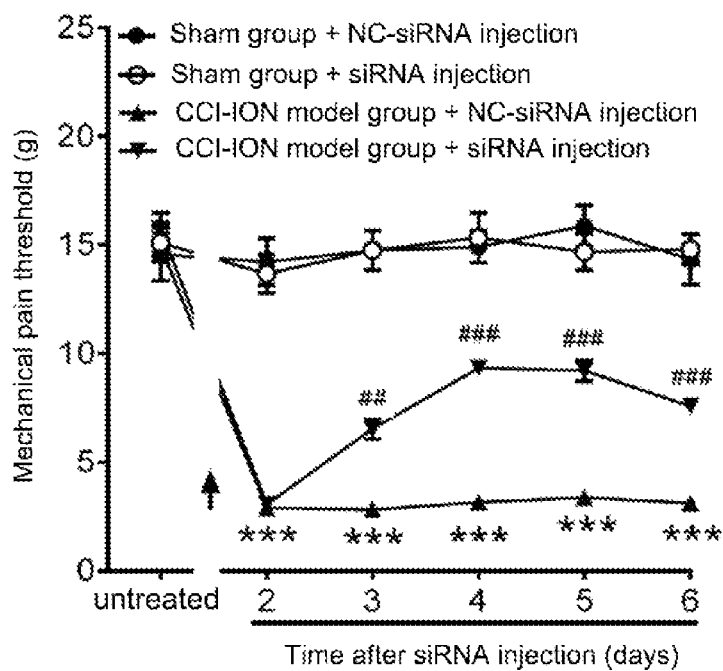
FIG. 4 shows that stereotactic injection of a siRNA interfering sequence in TG can significantly reverse the mechanical hyperalgesia in a CCI-ION model rat in an animal behavior test.

As shown in FIG. 4, 24 normal SD rats were divided into 4 groups with 6 rats in each group. The first group was the sham group+NC-siRNA injection, the second group was the sham group+siRNA injection; the third group was the CCI-ION model group+NC-siRNA injection, and the fourth group was the CCI-ION model group+siRNA injection (the sequence is the same as in Example 3). As shown in FIG. 4, the mechanical pain threshold in rats in the CCI-ION model group rises significantly on day 3 after siRNA injection, and this can continue to day 6 after injection (***$p<0.001$ vs. sham group, ##$p<0.01$, ###$p<0.001$ vs. CCI-ION model group+NC-siRNA injection). It shows that stereotactic injection of siRNA interfering sequence (CCGUGAACUGAAGCUUCAU, SEQ ID NO:1) in TG can significantly alleviate the pain behavior response induced in a rat of CCI-ION model, and the siRNA has obvious analgesic effect.

Example 5: The Mechanical Pain Threshold in a Normal Rat is Significantly Reduced after they were Stereotactically Injected with Lentivirus Overexpressing lncRNA XR_595534.2 in the TG, and Injection of siRNA in the TG can Significantly Reverse the Pain Behavior in a Rat (1) Determination of the mechanical pain threshold at the rat's whisker pad (see Example 1).
(2) Stereotactic injection of lentivirus overexpressing lncRNA XR_595534.2 (LV-lncRNA group) in normal rats was carried out and a control group (LV-NC-lncRNA group, purchased from Gemma Gene) was set. The virus titer was $1 \times 10^8$ TU. Each rat was injected with 3 µl, with a duration of 5 min, and the needle was left for 10 min. The injection method for siRNA interfering sequence was the same as in Example 1.

Figure 5:
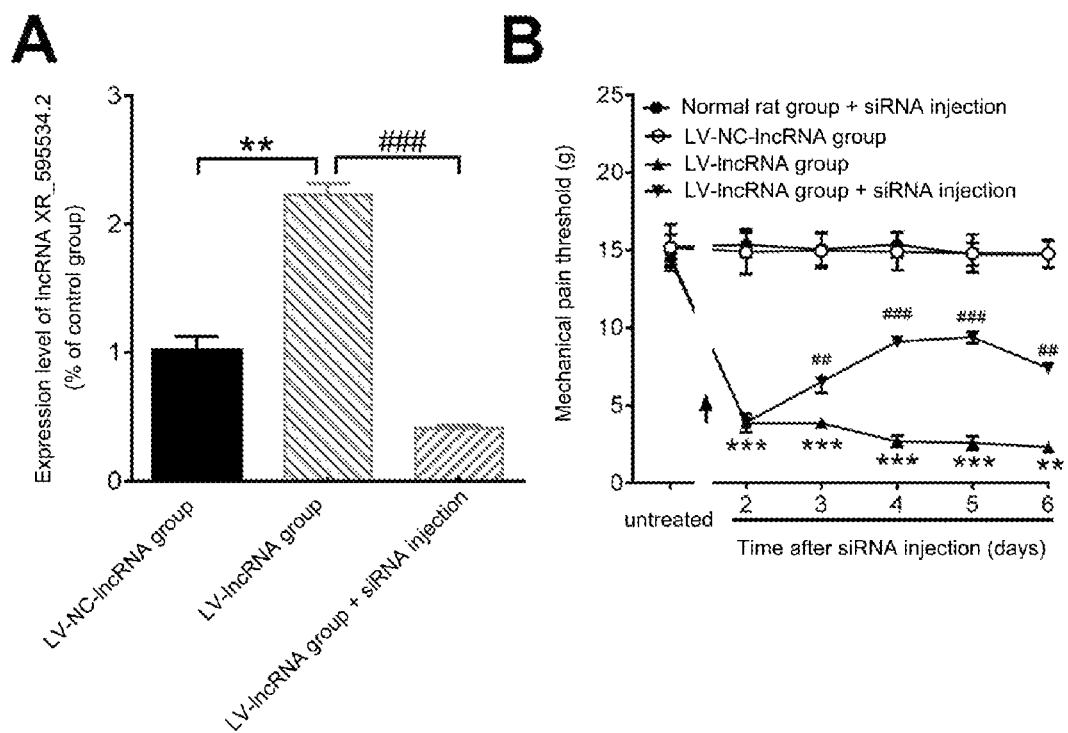
FIG. 5A shows that stereotactic injection of siRNA interfering sequence in TG can effectively reduce the level of lentivirus overexpressing lncRNA XR_595534.2 in the TG tissue of a normal rat.
FIG. 5B shows that the mechanical pain threshold in a normal rat is significantly reduced after stereotactic injection of lentivirus overexpressing lncRNA XR_595534.2 in TG, and the stereotactic injection of siRNA in TG can significantly reverse the pain behavior of a rat.

As shown in FIG. 5A, there were 6 rats in each group, and TG tissues were extracted respectively. After stereotactic injection of lentivirus overexpressing lncRNA XR_595534.2 (LV-lncRNA group) in the TG of a normal rat, the expression of lncRNA XR_595534.2 increases significantly. The stereotactic injection of siRNA interfering sequence (CCGUGAACUGAAGCUUCAU, SEQ ID NO: 1) in TG significantly reduces the expression level of lncRNA XR_595534.2 in the TG tissue ($p<0.01$ vs. LV-NC-lncRNA group, ###$p<0.001$ vs. LV-lncRNA group). As shown in FIG. 5B, 32 normal SD rats were divided into 4 groups with 8 rats in each group. In the first group, normal rats were stereotactically injected with siRNA interfering sequence in TG. In the second group, the rats were stereotactically injected with lncRNA XR_595534.2 null lentiviral vector (LV-NC-lncRNA group) in TG. In the third group, the rats were stereotactically injected with lncRNA XR_595534.2 expressing lentivirus (LV-lncRNA group) in TG. In the fourth group, the rats were stereotactically injected with lncRNA XR_595534.2 expressing lentivirus in TG, followed by injection of siRNA interfering sequence for 2 consecutive days after 7 days. The behavior test was carried out on days 2, 3, 4, 5, and 6 after the injection of siRNA interfering sequence to determine the mechanical pain threshold at the rat's whisker pad. The results show that the mechanical pain threshold in rats is significantly reduced (at day 7) after stereotactic injection of the lncRNA XR_595534.2 expressing lentivirus in the TG. The mechanical pain threshold of rats increases significantly 3 days after injection of siRNA, and this can continue to day 6 after injection. ($p<0.01$, ***$P<0.001$ vs. LV-NC-lncRNA group, ##$p<0.01$, ###$p<0.001$ vs. LV-lncRNA group). The above results show that the analgesic effect of the siRNA interfering sequence (CCGUGAACUGAAGCUUCAU, SEQ ID NO: 1) on trigeminal neuralgia is achieved by specifically targeting and inhibiting lncRNA XR_595534.2.

In the present invention, a high-throughput sequencing method is employed. In Example 1 and Example 2, it is found that the expression of lncRNA XR_595534.2 in the TG tissue of the CCI-ION model rat changes significantly, lncRNA XR_595534.2 is expressed in the TG tissue of a rat, and the expression level of lncRNA XR_595534.2 is significantly increased after a CCI-ION model is established. In Example 3, the effect of siRNA interfering sequence (CCGUGAACUGAAGCUUCAU, SEQ ID NO: 1) on the expression of lncRNA XR_595534.2 in the TG of a rat is studied. It is found that the siRNA interfering sequence can target and inhibit the expression of lncRNA XR_595534.2 in the TG of a rat.

In Examples 4 and 5, the present invention studies the effect of siRNA interfering sequence on the mechanical pain threshold in a rat of trigeminal neuralgia model induced by CCI-ION by animal experiments. It is found that stereotactic injection of the siRNA interfering sequence in TG can alleviate CCI-ION-induced pain behavior in a rat, and has an analgesic effect. In addition, the influence of the siRNA interfering sequence on the pain threshold at rat's whisker pad induced by lentivirus overexpressing lncRNA XR_595534.2 is studied. It is found that stereotactic injection of the siRNA interfering sequence in TG can alleviate the pain behavior response of rats induced by lncRNA XR_595534.2. It is confirmed that the significant analgesic effect of siRNA interfering sequence is achieved by the targeted inhibition of lncRNA XR_595534.2.

The present invention discovers that the siRNA interfering sequence can significantly reverse the mechanical hyperalgesia in rats of the CCI-ION model by targeted inhibiting the expression of lncRNA XR_595534.2, and has an obvious analgesic effect. Therefore, the siRNA interfering sequence can also be used in the preparation of a medicine for the treatment and/or prevention of diseases where lncRNA XR_595534.2 is a target, such as trigeminal neuralgia, neuropathic pain, migraine and malignant tumors.

Preferred embodiments of the present invention are described above, which, however, are not intended to limit the present invention. It should be noted that several improvements and modifications can be made by those skilled in the art, without departing from the technical principles of the present invention. Such improvements and modifications also fall into the protection scope of the present invention.

What is claimed is:

1. A method for treating chronic pain, comprising:
providing a medicine comprising an interfering RNA, wherein the interfering RNA targets and interferes with the expression of lncRNA XR_595534.2, and the interfering RNA comprises the nucleotide sequence CCGUGAACUGAAGCUUCAU (SEQ ID NO: 1); and
treating a subject having chronic pain with the medicine.

2. The method according to claim 1, wherein the chronic pain is selected from the group consisting of trigeminal neuralgia, migraine, neuropathic pain and cancer pain.

3. The method according to claim 1, wherein a sense strand of the interfering RNA comprises the nucleotide sequence: 5'-CCGUGAACUGAAGCUUCAU-3' (SEQ ID NO: 1), and an antisense strand of the interfering RNA comprises the nucleotide sequence: 5'-AUGAAGCUUCAGUUCACGG-3' (SEQ ID NO: 2).

4. The method according to claim 3, wherein the interfering RNA comprises a dangling base TT; and the dangling base is located at the 3'-terminus of the sense strand and the antisense strand of the interfering RNA.

5. The method according to claim 4, wherein in the interfering RNA comprising the dangling base TT, the sequence of the sense strand is: 5'-CCGUGAACUGAAGCUUCAUTT-3' (SEQ ID NO: 3); and the sequence of the antisense strand is: 5'-AUGAAGCUUCAGUUCACGGTT-3' (SEQ ID NO: 4).

6. The method according to claim 1, wherein the interfering RNA is modified by cholesterol, phosphorylation, sulfhydrylization and any combination thereof.

7. A medicine for the treatment of chronic pain, comprising 0.1-100 wt % of an interfering RNA and 0-99.9 wt % of a pharmaceutical adjuvant,
wherein the interfering RNA comprises the nucleotide sequence CCGUGAACUGAAGCUUCAU (SEQ ID NO: 1).

* * * * *